April 30, 1940.    H. J. HORN    2,198,721
VEHICLE WHEEL
Filed July 3, 1937

INVENTOR.
HARRY J. HORN.
BY
Carroll R. Taber
ATTORNEY.

Patented Apr. 30, 1940

2,198,721

UNITED STATES PATENT OFFICE 2,198,721

VEHICLE WHEEL

Harry J. Horn, Lansing, Mich., assignor to Motor Wheel Corporation, Lansing, Mich., a corporation of Michigan Application July 3, 1937, Serial No. 151,797

9 Claims. (Cl. 301—108)

This invention relates to vehicle wheels, and particularly to the means for securing a wheel body and a cover plate or hub cap on the hub member.

One object of the invention is to construct a cover which will be mounted over and held in place by the same means that is used to attach the wheel body to the hub.

Another object is to construct a cover which is adaptable to be mounted on the wheel and conceal the central portion of the wheel body and the hub, but leave the attaching means for the wheel body exposed.

A still further object of the invention is to provide an improved means for securing both a cover and wheel body to the hub simultaneously with the same securing means and yet leave the cover free of any strain due to holding the wheel body to the hub.

Another object of the invention is to provide a cover for concealing the hub and part of the wheel body, which has incorporated therein the means for securing the cover and wheel body to the hub.

Other objects of the invention will appear in the following description and appended claims, reference being had to the accompanying drawing forming a part of this specification wherein like reference characters designate corresponding parts in the several views:

Figure 1:
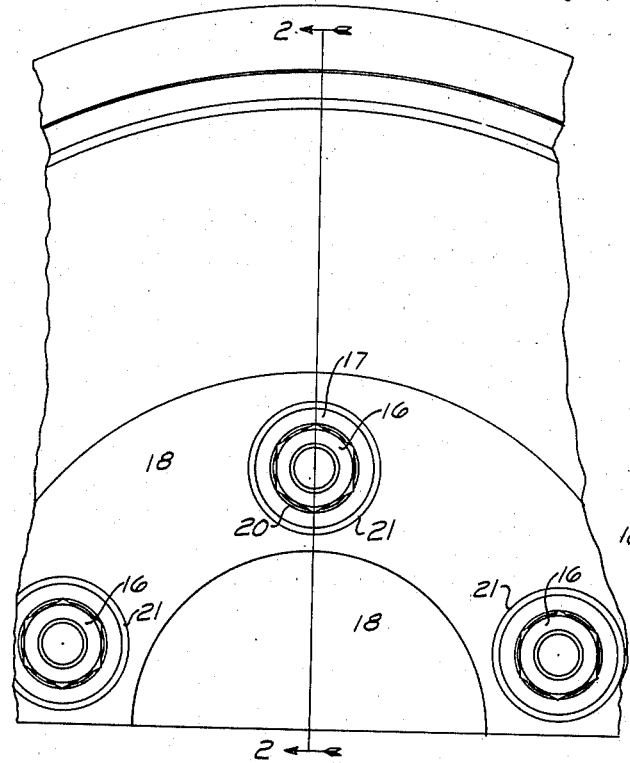
Figure 1 is a fragmentary elevational view of a wheel assembly having a cover thereon.
Figure 2:
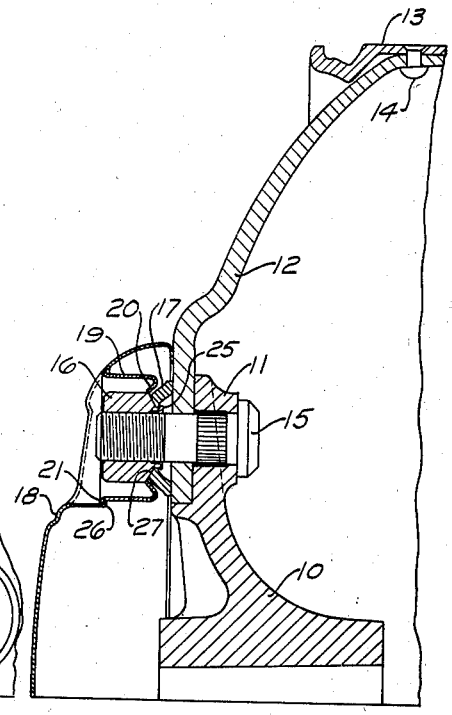
Figure 2 is a fragmentary cross-sectional view taken on line 2—2 of Figure 1.
Figure 4:
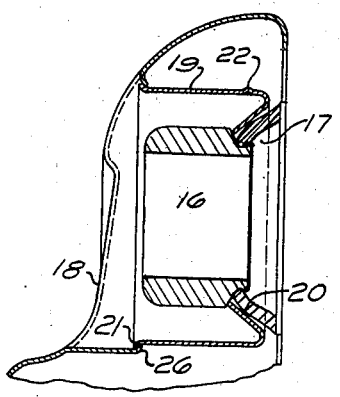
Figure 4 is a view on a still larger scale of the attaching means shown in Figures 1 and 2, the cover being shown in section.

In the embodiment shown in Figures 1, 2 and 4 the wheel hub member is designated by the numeral 10 and has a circular flange 11 extending radially therefrom. This hub member is of conventional design and is mounted on the axle in any approved manner. Secured to the hub flange 11 are the usual stud bolts 15, and mounted on this flange by means of said stud bolts is the wheel body 12. The wheel body is locked in position on the studs by the nut and washer assembly 16 and 17. Wheel body 12 is flanged axially at its periphery and rim 13 is secured to this flange by rivets 14.

The cover 18, which conceals the hub and central portion of the wheel, has a plurality of spaced depressions formed in its outer face, each depression being located adjacent a corresponding stud bolt. These depressions, as can be seen in Figure 1, are circular and the bottom of each depression has a circular aperture therein, concentric with its respective stud bolt. As the diameter of the aperture is less than that of the depression, it provides a radially extending flange 26.

Mounted in each aperture is a generally cylindrical member 19 which is flanged radially outwardly at its outer end, as shown at 21, to overlap flange 26. The tubular member fits just loosely enough in the aperture so that it is slidable axially therein, but it is prevented from removal by small protuberances 22 near the inner end of the member 19 and by the flange 21. The tubular member is also flanged inwardly at 20 for a purpose to be described later.

Each nut 16 is tapered at its inner end as shown at 27 in Figure 2, and in addition has a short cylindrical portion 25 extending from the tapered portion. A bell-shaped washer 17 has a tapered end complementary to the taper on the nut. The washer is slipped on the portion 25 of the nut, after which the mouth of portion 25 is swaged outwardly, to hold the washer securely on the nut. The washer is not wedged tightly to the nut, but fits sufficiently loosely to allow a slight relative movement of the two parts.

As will be seen in Figures 2 and 4, the internal diameter of flange 20 is slightly less than the distance across opposite corners of nut 16. Accordingly, the nut may be forced axially through the opening formed by flange 20, if sufficient pressure is applied, thereby distorting said flange momentarily. After the nut has passed through said opening, the flange returns to its normal position of Figures 2 and 4, and is permanently held between the nut and washer. The nut may not be removed from the cylindrical member 19, as an attempt to remove it results in a tendency to bend the flange 20 toward the right, in Figures 2 and 4, or in other words, to bend it toward a position normal to the axis of the cylindrical member. The aperture defined by flange 20 consequently tends to decrease in diameter, preventing passage of the nut therethrough.

It will be apparent that the nut may be attached to the cover plate prior to the attachment thereof to the wheel, or the nuts may be screwed on the stud bolts, and the cover plate then forced over the nuts. In either case, however, the entire assembly becomes a permanent one, once the parts are secured together.

The cover 18 may be readily removed from the wheel by merely unscrewing the nuts from the stud bolts. The tubular member 19 has enough axial play in the aperture defined by flange 26 to allow each nut to be completely removed from its respective stud bolt without distorting the cover plate.

Figure 3:
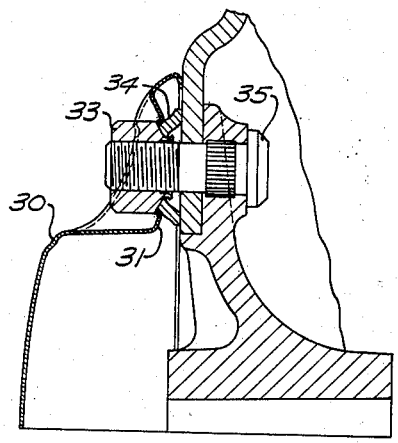
Figure 3 is a fragmentary cross-sectional view of a modified form of my invention, the view corresponding to that shown in Figure 2.

In the modification of my invention shown in Figure 3, the slidable cylindrical member 19 is dispensed with, and a nut 33 and washer 34 are mounted directly on the main body of the cover. The cover plate 30 has a plurality of depressions arranged about the circumference thereof in the same manner as in Figures 1, 2 and 4. These depressed portions are apertured at the bottom so that flanges 31 which extend generally radially inwardly are formed and the nut 33 and the washer 34 are mounted over this flange, the edge of flange 31 seating in the groove formed between the nut and washer.

This construction has no provision for relative movement between the cover plate 30 and nut 33 and washer 34, aside from the slightly loose fit of the nut and washer on the flange 31. The cover plate, however, is rather flexible and may be distorted enough to allow the nuts to be unscrewed from the stud bolts. It may be impossible to completely remove one of the nuts from its stud bolt while the remaining nuts are drawn up tightly, but in such a case the cover can be removed by rotating each nut in succession for a few turns, proceeding around the wheel several times until all of the nuts are completely free.

It will thus be seen that I have provided a wheel cover structure in which all parts are permanently assembled, so that there is no danger of loss of the nuts when they are removed from the stud bolts. The entire organization is of an attractive appearance and conceals all of the portions of the wheel which it is advisable to cover.

It is apparent that my invention is capable of other varied uses not specifically described, and that the invention is to be limited only by the terms of the appended claims.

I claim:

1. In a wheel assembly, the combination of a hub having a flange extending radially therefrom, a plurality of stud bolts secured to and extending axially outwardly from said flange, a wheel body member on said hub having a plurality of apertures therein to receive said stud bolts, a hub cap for concealing said hub and a portion of said wheel body member, said hub cap having a plurality of inwardly depressed portions therein at the location of each stud bolt, each depressed portion being apertured to receive a stud bolt, and flanged radially toward the center of said aperture, a nut within each depression, a washer on the face of the hub cap opposite the nut and permanently secured to each nut, the nuts being removably attached to the stud bolts.

2. An ornamental cover plate for a wheel hub member comprising a generally dish-shaped plate having an aperture therein adjacent the periphery thereof, the plate being axially inwardly depressed about said aperture thus forming a generally radially extending flange surrounding the aperture, and means permanently attached to the cover plate in the depression comprising a nut of slightly greater diameter than the diameter of the aperture, on the outer side of said flange, and a washer on the other side of said flange permanently secured to said nut.

3. A vehicle wheel comprising a hub member, a rim member located in spaced relation thereto, a wheel body rigidly secured to one of said members, means for removably securing the wheel body to the other member including a plurality of clamping elements, each of said clamping elements consisting of a nut and a washer swivelly connected thereto to form an annular groove between the bodies thereof, cover means for the wheel having a periphery extending beyond the clamping elements, said cover means having a plurality of apertures therein, one of said clamping elements being permanently located in each of said apertures with the nut located outside and the washer located inside of the cover, the diameters of said apertures being greater than the diameters of the grooves in the respective clamping elements and less than the greatest diameter of the body portions of the nuts and washers.

4. A vehicle wheel comprising, in combination, a plurality of stud bolt assemblies, each assembly including a nut, a washer loosely secured to the base of the nut and providing a groove between said nut and washer, a cover having a plurality of spaced apertures therein, a tubular member in each aperture, means to prevent removal of said tubular member from the nut including a substantially radially extending flange at the inner end of the tubular member forming an aperture of less diameter than the largest diameter of the nut, said last mentioned flange being permanently located in said groove.

5. A vehicle wheel comprising, in combination, a plurality of stud bolt assemblies, each assembly including a nut, a washer loosely secured to the base of the nut and providing a groove between said nut and washer, a cover having a plurality of depressions therein, an aperture in each depression, a tubular member in each aperture, means to prevent removal of said tubular member from said cover including a radial flange at the outer end thereof, and a substantially radially extending flange at the inner end of the tubular member forming an opening of less diameter than the largest diameter of the nut, said last mentioned flange being permanently located in said groove.

6. A vehicle wheel comprising, in combination, a plurality of stud bolt assemblies, each assembly including a nut, a washer loosely secured to the nut and providing a groove between said nut and washer, a cover having a plurality of apertures therein of less diameter than the largest diameter of said nut, said aperture being defined by a substantially radially extending flange, said flange being disposed within the groove between the nut and washer.

7. In a wheel assembly, in combination, a hub having a radially extending flange, a plurality of stud bolts secured to and extending axially outwardly from said flange, a wheel body on said hub having a plurality of apertures, each stud bolt extending through an aperture in the wheel body, a cover plate having a plurality of axially inwardly depressed portions therein formed with an aperture in the bottom thereof, each of said apertures receiving a corresponding stud bolt, a nut disposed within each depression on one side of the cover plate, said nut being of a greater diameter than the associated aperture, a washer disposed on the opposite side of the cover plate in cooperative relation to each of said nuts, each of said washers having a portion of greater diameter than the diameter of the associated aperture, the nuts and washers being permanently connected to each other by means extending through the associated aperture in the cover plate, each nut and washer being removably attached to its respective stud bolt.

8. An ornamental cover plate for a wheel hub member comprising a generally dish-shaped plate having an aperture therein, a cylindrical member disposed within the aperture, said cylindrical member having an outwardly projecting radial flange at one end and an inwardly projecting substantially radially extending flange at the other end with the outwardly projecting flange overlying the rim of said aperture at the outer face of the cover, means on said cylindrical member spaced from the last mentioned flange to prevent withdrawal of the cylindrical member from the aperture, a nut in the cylindrical member having a portion positioned on each side of the inwardly projecting flange, and a washer permanently but loosely secured to the nut at the inner face of said flange.

9. The combination with a wheel of cover means therefor comprising a plate having circumferentially spaced apertures adjacent its periphery and a clamping element associated with each of said apertures, each clamping element comprising a nut located on one side of the cover and a washer located on the other side of the cover, each nut being swivelly connected to the associated washer by means extending through the aperture, each nut and washer including respectively a portion of greater diameter than the diameter of the associated aperture.

HARRY J. HORN.